United States Patent [19]
Kelley

[11] Patent Number: 5,178,407
[45] Date of Patent: Jan. 12, 1993

[54] FOLDED AIR BAG
[75] Inventor: Scott A. Kelley, Anchorville, Mich.
[73] Assignee: TRW Vehicle Safety System Inc., Lyndhurst, Ohio
[21] Appl. No.: 726,840
[22] Filed: Jul. 8, 1991
[51] Int. Cl.⁵ .............................................. B60R 21/20
[52] U.S. Cl. .................................... 280/728; 280/743
[58] Field of Search ............... 280/728, 743, 742, 729, 280/731, 732, 740

[56] References Cited
U.S. PATENT DOCUMENTS

| | | |
|---|---|---|
| 3,748,477 | 7/1973 | Wulbrecht . |
| 4,004,828 | 1/1977 | Sogabe et al. . |
| 4,173,356 | 11/1979 | Ross . |
| 4,178,017 | 12/1979 | Ishi et al. ............................. 280/742 |
| 4,235,453 | 11/1980 | Lawson et al. . |
| 4,262,931 | 4/1981 | Strasser et al. . |
| 4,286,954 | 9/1981 | McArthur et al. . |
| 4,351,544 | 9/1982 | Ross . |
| 4,828,286 | 5/1989 | Fohl . |
| 4,836,576 | 6/1989 | Werner et al. ....................... 280/743 |
| 4,903,986 | 2/1990 | Cok et al. . |
| 4,944,529 | 7/1990 | Backhaus . |
| 5,004,266 | 4/1991 | Miller et al. . |
| 5,018,762 | 5/1991 | Suzuki et al. ........................ 280/743 |
| 5,022,675 | 6/1991 | Zelenak, Jr. et al. ............... 280/743 |
| 5,074,585 | 12/1991 | Satoh .................................. 280/743 |

FOREIGN PATENT DOCUMENTS
63-212147 5/1988 Japan .

Primary Examiner—Margaret A. Focarino
Assistant Examiner—Paul Dickson
Attorney, Agent, or Firm—Tarolli, Sundheim & Covell

[57] ABSTRACT

An inflatable air bag restrains a vehicle occupant when inflated. The air bag comprises a first portion having a first plurality of folds disposed in a stacked relationship. The first portion of the air bag includes a surface area which is to be adjacent the torso of the occupant when the air bag is inflated. A second portion of the air bag has a second plurality of folds disposed in a stacked relationship. The second portion of the air bag includes a surface area which is to be adjacent the vehicle windshield when the air bag is inflated. A part of the air bag extends along the first plurality of folds for retarding an initial flow of inflating fluid into the first portion of the air bag and for directing an initial flow of inflating fluid into the second portion of said air bag.

12 Claims, 6 Drawing Sheets

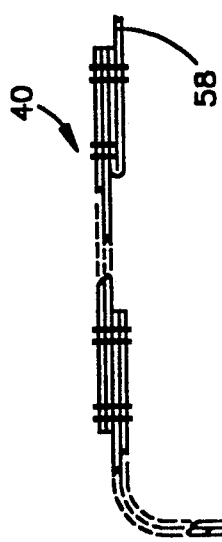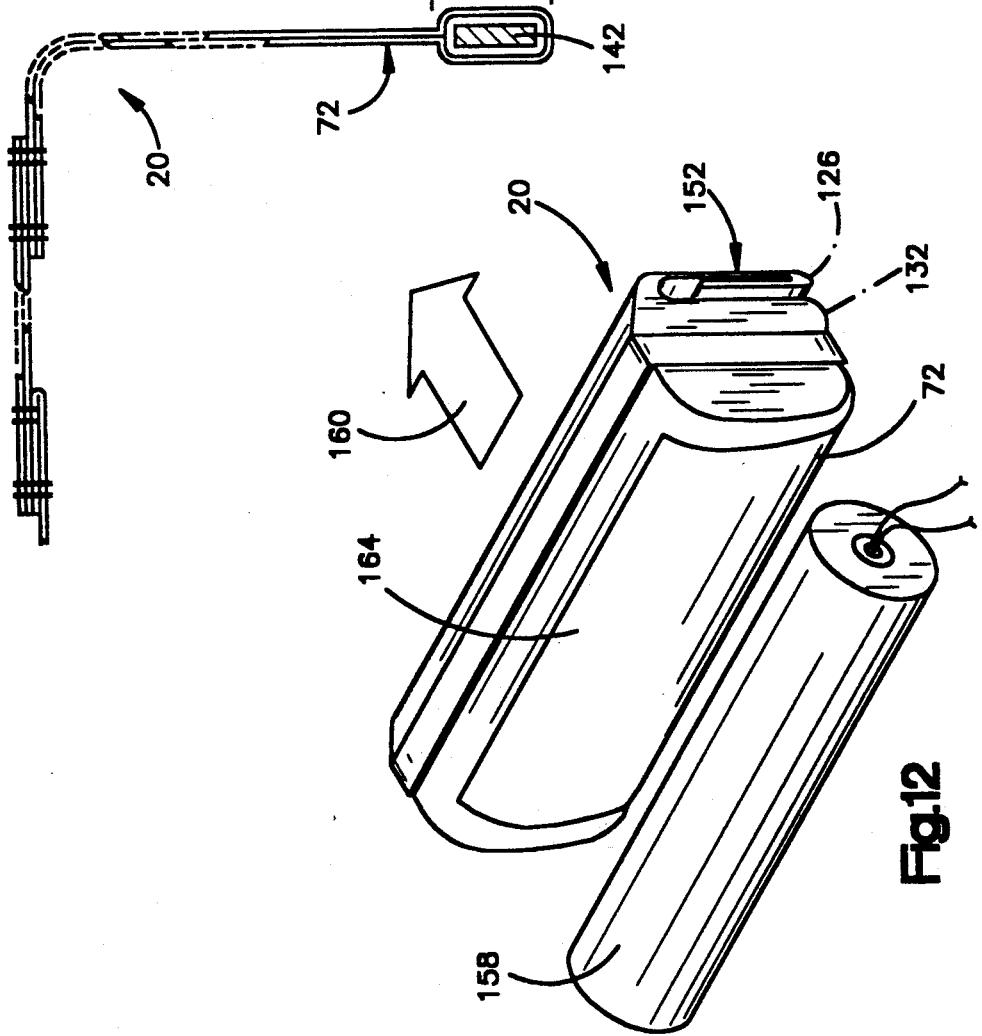

FOLDED AIR BAG

BACKGROUND OF THE INVENTION

The present invention relates to an air bag which is inflatable to restrain an occupant of a vehicle during a collision. More specifically, the present invention relates to folding an air bag in a manner to obtain controlled initial deployment of the air bag.

An air bag is typically folded and supported in the dashboard or steering wheel of a vehicle. Commonly, the air bag has a number of folds. When the air bag is to be inflated, high pressure gas is directed into the air bag which causes the air bag to unfold and inflate.

U.S. Pat. No. 3,748,477 discloses an air bag with most of the air bag disposed in a roll and a portion of the air bag disposed in a fold which extends across the roll. Upon initiation of inflation of the air bag, high pressure fluid is first directed into the fold to initially deploy the folded portion of the air bag. The rolled portion of the air bag is then unrolled as the air bag is inflated.

SUMMARY OF THE INVENTION

In accordance with the present invention, an air bag is folded and then mounted in a vehicle. The air bag is folded in a manner which results, upon beginning the inflation of the air bag, in deployment of a portion of the air bag which is to be adjacent to the windshield of the vehicle. As inflation of the air bag continues, a portion of the air bag which is to be adjacent to the torso of the vehicle occupant is deployed During folding of the air bag, the portion of the air bag which is to be adjacent to the torso of the vehicle occupant is folded and the folds placed in a stacked relationship. The portion of the air bag which is to be adjacent to the windshield of the vehicle is also folded and the folds placed in a stacked relationship. A part of the folded air bag directs an initial flow of fluid into the folded portion of the air bag which is to be adjacent to the windshield, causing that portion of the air bag to inflate initially.

BRIEF DESCRIPTION OF THE DRAWINGS

The foregoing and other objects and features of the present invention will become more apparent to one skilled in the art upon a consideration of the following description taken in connection with the accompanying drawings, wherein:

FIG. 12 is a schematic view depicting the relationship between the folded air bag of FIG. 11 and an inflator assembly; and FIG. 13 is a partial sectional view, taken generally along the line 13—13 of FIG. 3.

DESCRIPTION OF ONE SPECIFIC PREFERRED EMBODIMENT OF THE INVENTION

Figure 1:
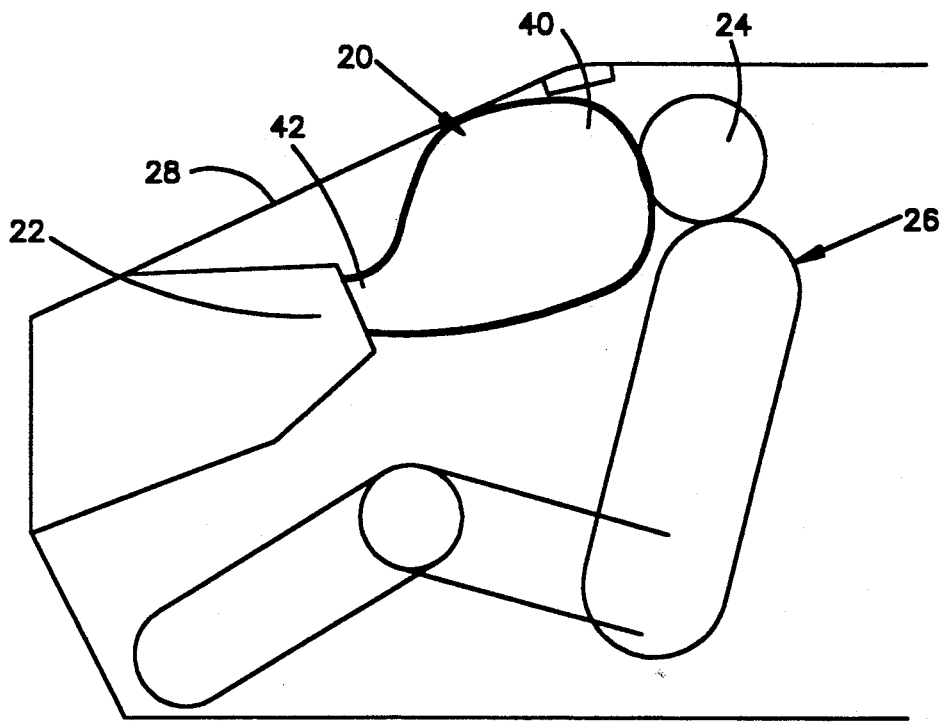
FIG. 1 is a schematic illustration depicting partial inflation of an air bag which was folded and stored in a known manner.

Commonly, an air bag is stored in a folded condition in the dashboard or steering wheel of a vehicle. Upon the occurrence of a vehicle collision, the air bag is inflated to restrain a vehicle occupant during the collision. As shown in FIG. 1, upon initiation of inflation of a known air bag 20, fluid under pressure (e.g., nitrogen gas) deploys a part of the air bag from a dashboard 22 of a vehicle toward the head 24 of a vehicle passenger 26 and toward a windshield 28 of the vehicle.

Figure 2:
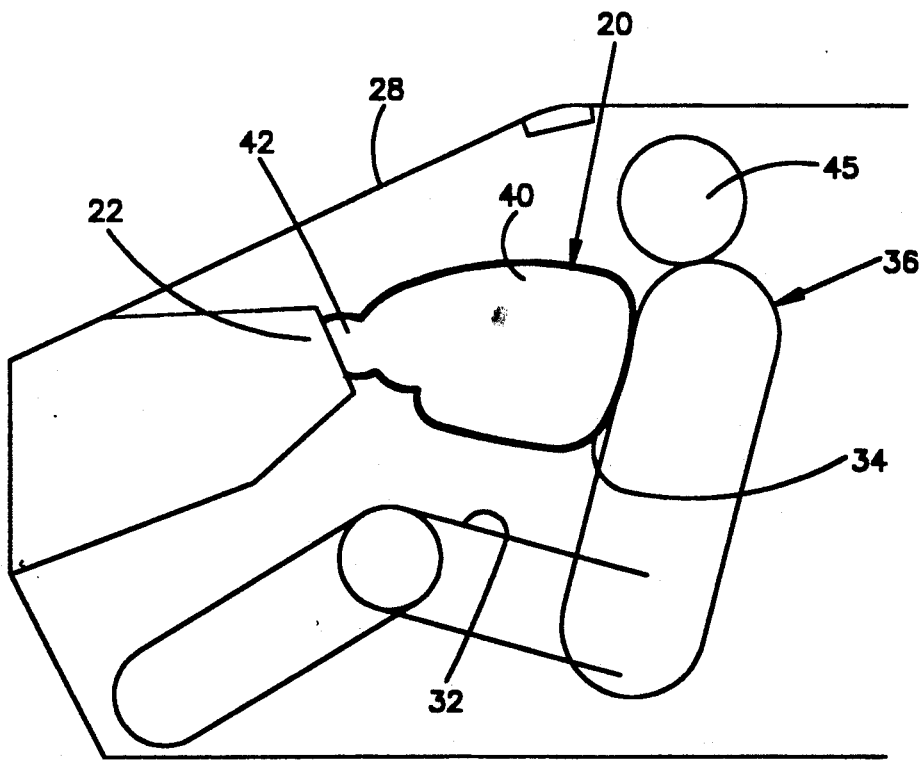
FIG. 2 is a schematic illustration, generally similar to FIG. 1, depicting partial inflation of an air bag which was folded and stored in accordance with the present invention.

FIG. 2 schematically illustrates initial deployment of a part of an air bag 20, of the same construction as the air bag 20 shown in FIG. 1. However, the air bag 20 in FIG. 2 is folded in accordance with the present invention. As the high pressure fluid (e.g., nitrogen gas) enters the air bag 20 of FIG. 2, a part of the air bag initially deploys toward the lap 32 and torso 34 of a passenger 36 in the vehicle, and does not initially deploy toward the head of the occupant as in FIG. 1.

Figure 3:
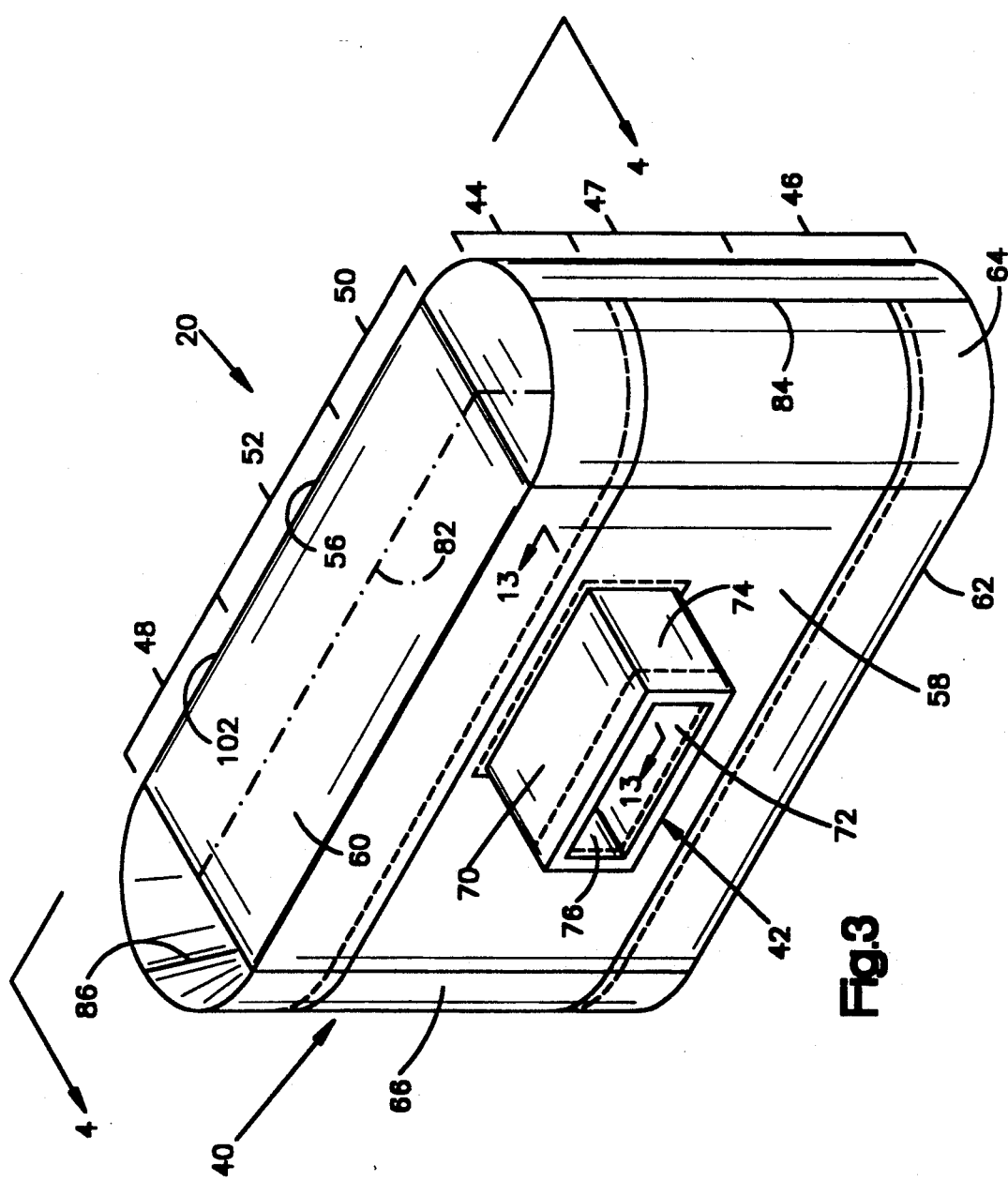
FIG. 3 is a schematic illustration of the air bag of FIGS. 1 and 2 unfolded and expanded.

It should be understood that the air bag 20 has been shown in FIGS. 1 and 2 in a partially inflated condition. When the air bag 20 is in a fully inflated condition, the air bag is disposed between the passenger 26 or 36 and the dashboard 22 and windshield 28 of the vehicle. This enables the air bag 20 to restrain movement of the passenger 26 or 36 during sudden vehicle deceleration The air bag 20 is schematically illustrated in FIG. 3 in an unfolded and expanded, but not inflated, condition. As shown in FIG. 3, the air bag 20 includes a main section 40. A generally rectangular connector section 42 connects the main section 40 of the air bag 20 with the dashboard 22 of the vehicle.

When the air bag 20 is inflated, an upper portion 44 (FIG. 3) of the main section 40 of the air bag is deployed between the windshield 28 and head 45 (FIG. 2) of the passenger 36. A lower portion 46 (FIG. 3) of the inflated air bag 20 is deployed adjacent to the lap 32 (FIG. 2) of the passenger 36. A central portion 47 (FIG. 3) of the main section 40 of the air bag 20 is deployed adjacent to the torso 34 (FIG. 2) of the passenger 36. An outboard portion 48 (FIG. 3) of the main section 40 of the air bag 20 is disposed adjacent to the door on the passenger side of the vehicle. An inboard portion 50 of the main section 40 of the air bag 20 is disposed adjacent to the driver of the vehicle. A central portion 52 of the main section 40 of the air bag 20 is disposed between the outboard portion 48 and inboard portion 50.

Due to the position in which the air bag 20 is located in the dashboard 22 of the vehicle, the length of the outboard portion 48 of the air bag is greater than the length of the inboard portion 50 of the air bag. Also, the length of the lower portion 46 of the main section 40 of the air bag 20 is greater than the length of the upper portion 44 of the main section 40 of the air bag. The configuration of the main section 40 of the air bag 20 and the relative sizes of the upper and lower portions 44 and 46 and outboard and inboard portions 48 and 50 of the main section 40 of the air bag will vary depending upon the construction of the particular vehicle in which the air bag is to be mounted and the location of the air bag in the vehicle.

The main section 40 of the air bag 20 has a rectangular rear panel 56 which, when the air bag is inflated, engages the torso 34 of the passenger 36. A rectangular front panel 58 engages the dashboard 22 of the vehicle when the air bag 20 is inflated. A generally rectangular upper panel 60 of the main section 40 of the inflated air bag 20 is located adjacent to the roof of the vehicle. A generally rectangular lower panel 62 is located adjacent to the lap 32 of the passenger when the air bag 20 is inflated.

A generally rectangular and curved inboard end panel 64 connects the rear and front panels 56 and 58 and the upper and lower panels 60 and 62. Similarly, a generally rectangular and curved outboard end panel 66 is connected with the rear, front, upper and lower panels 56, 58, 60 and 62. Openings (not shown) are provided in the inboard end panel 64 to enable fluid to be discharged from the air bag 20 to enable the air bag to deflate.

The connector section 42 extends forward from the front panel 58 of the main section 40 of the air bag 20. Due to the location at which the air bag 20 is stored in the dashboard 22 of a vehicle, the connector section 42 is connected with the front panel 58 at a location which is offset upwardly and inwardly from the center of the front panel 58. Thus, the connector section 42 is closer to the upper panel 60 of the main section 40 of the air bag 20 than it is to the lower panel 62 of the main section. Similarly, the connector section 42 is closer to the inboard end panel 64 of the main section 40 of the air bag 20 than it is to the outboard end panel 66 of the main section of the air bag.

The connector section 42 includes upper panel 70 which extends parallel to a lower panel 72. The rectangular upper and lower panels 70 and 72 are interconnected by a rectangular inboard end panel 74 and a rectangular outboard end panel 76. Although one specific preferred embodiment of the air bag 20 has been illustrated in FIG. 3, it should be understood that the air bag 20 is known and that the air bag could have a different construction if desired.

As noted above, prior to inflation, the air bag 20 is stored in a folded condition in the dashboard 22 of the vehicle. To fold the air bag 20, the rear and front panels 56 and 58 are placed in overlying engagement with each other, in the manner illustrated in FIGS. 4 and 5. The top and bottom panels 60 and 62 are tucked inwardly between the rear and front panels 56 and 58. The top panel 60 is folded inwardly along a fold line 82 (FIG. 3) and is positioned between the rear and front panels 56 and 58. The lower panel 62 is folded inwardly along a fold line (not shown) in the same manner as the upper panel 60.

Figure 4:
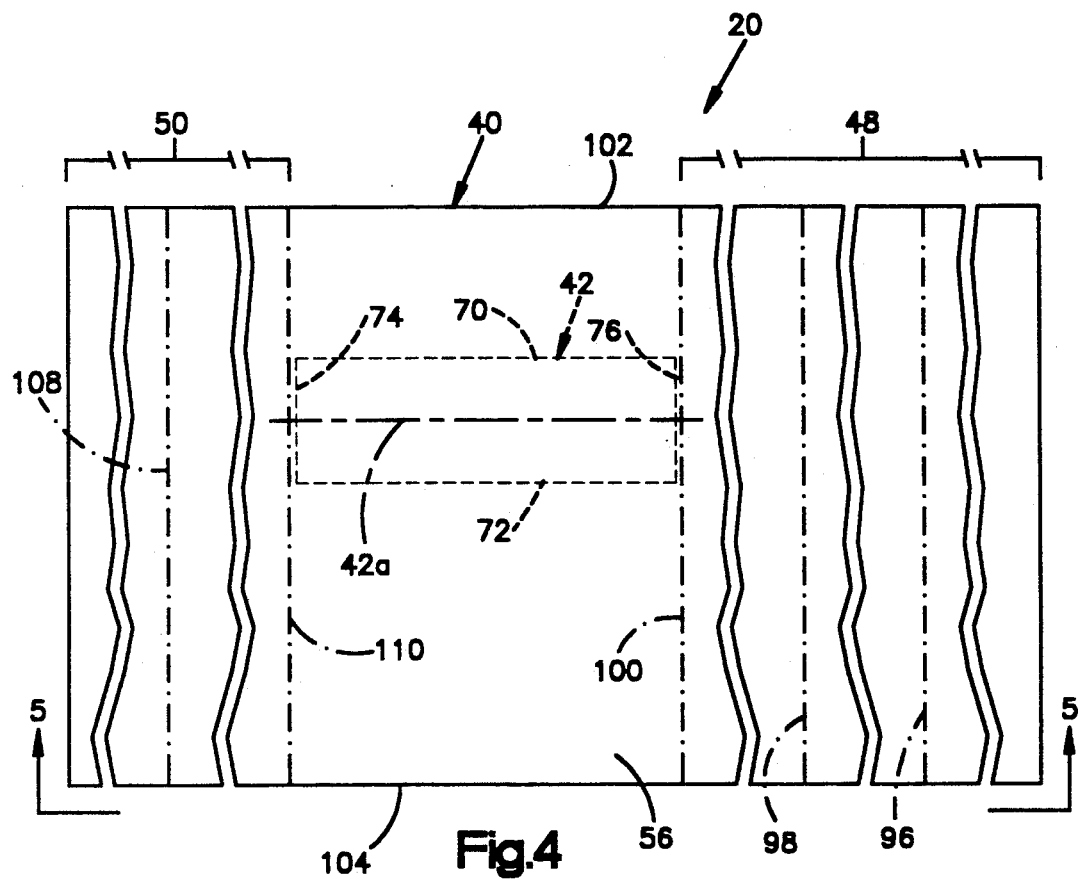
FIG. 4 is a plan view of the air bag of FIG. 3 when the air bag is in a deflated condition and prior to folding of the air bag.

The inboard and outboard end panels 64 and 66 are folded outwardly along seams 84 and 86 (FIG. 3). The outwardly folded inboard and outboard end panels 64 and 66 then form continuations of the rear panel 56 and front panel 58. This results in the main section 40 of the air bag 20 being formed into a flat rectangle with the inboard and outboard portions 48 and 50 at opposite ends of the rectangle. The connector section 42 extends downwardly from the rectangle formed by the flattened main section 40 (FIGS. 4 and 5).

Figure 5:
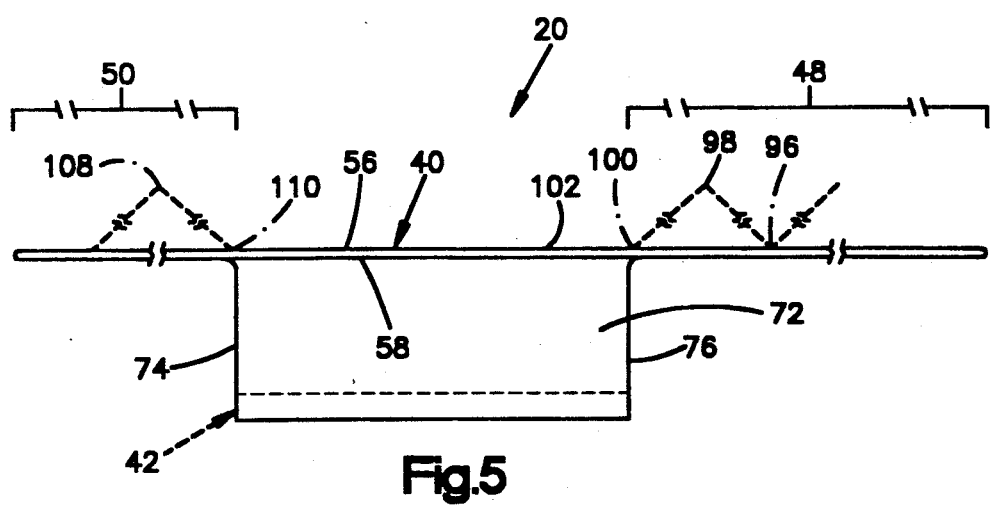
FIG. 5 is a side elevational view, taken along the line 5—5 of FIG. 4.
Figure 6:
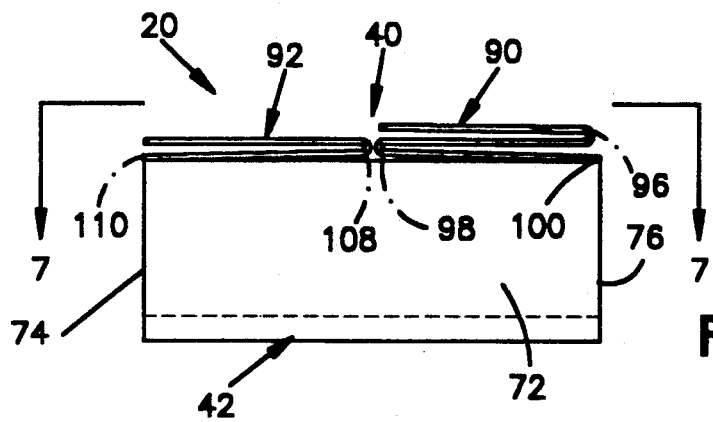
FIG. 6 is a side elevational view illustrating the air bag in a partially folded condition.

The outboard and inboard portions 48 and 50 are then folded in a zig-zag fashion, in the manner indicated in dashed lines in FIG. 5. The folded outboard and inboard portions 48 and 50 are then placed in two stacks 90 and 92 (FIG. 6) disposed above the connector section 42. The outboard portion 48 of the air bag 20 is folded at three parallel fold lines 96, 98, and 100 (FIGS. 4 and 5). These fold lines extend perpendicular to an upper edge 102 and a lower edge 104 (FIG. 4) of the rear panel 56. The inboard portion 50 is folded at two parallel fold lines 108 and 110. These fold lines also extend perpendicular to the upper edge 102 and lower edge 104 of the rear panel 56

Figure 7:
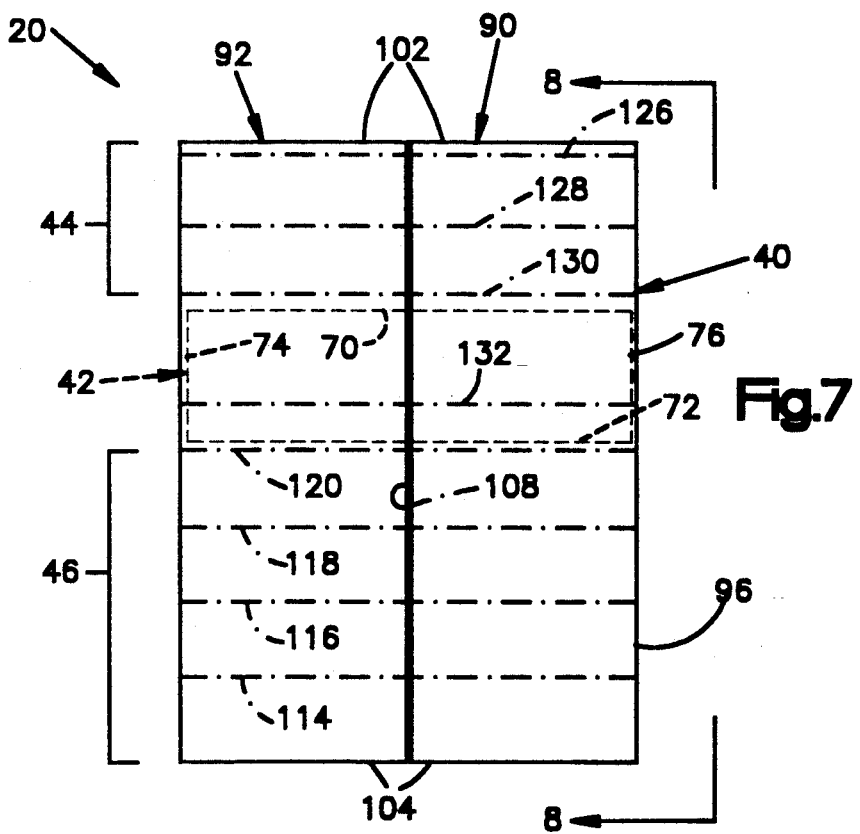
FIG. 7 is a plan view, taken generally along the line 7—7 of FIG. 6.

The distance between the fold lines 96 and 98 and between the fold liner 98 and 100 is equal to the distance between the fold lines 108 and 110. This results in the stack 90, containing the outboard portion 48, being higher than the stack 92, containing the inboard portion 50 (see FIG. 6). However, the stacks 90 and 92 both have the same length and the same width (FIG. 7). The width of the combined stacks 90 and 92 is equal to the length of the connector section 42. The length of the stacks 90 and 92 is equal to the distance between the upper and lower edge portions 102 and 104 (FIGS. 4 and 7) of the rear panel 56.

Figure 8:
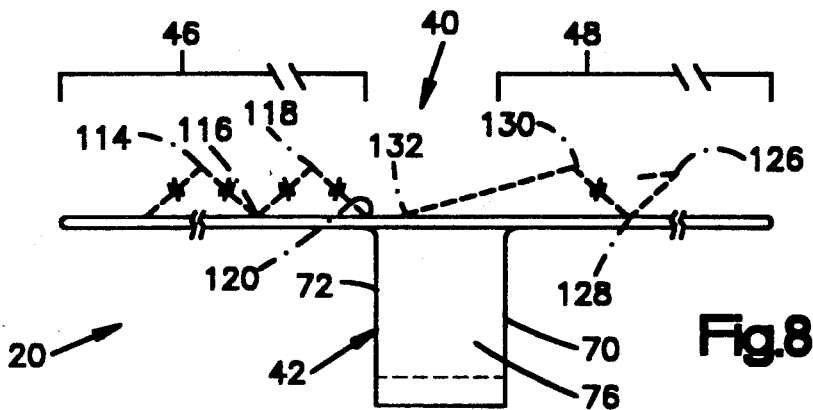
FIG. 8 is a schematic view, taken generally along the line 8—8 of FIG. 7, and illustrating the folding of the air bag.

The upper and lower portions 44 and 46 of the main section 40 of the air bag 20 are then folded in a zig-zag fashion in the manner indicated in dashed lines in FIG. 8. Accordingly, the lower portion 46 (FIG. 7) of the main section 40 of the air bag 20 is folded along lines 114, 116, 118 and 120 which extend across the stacks 90 and 92 in a direction parallel to a longitudinal central axis of the connector section 42. The upper portion 44 of the main section 40 of the air bag 20 is then folded along lines 126, 128, 130 and 132 which extend across the stacks 90 and 92 in a direction parallel to the longitudinal central axis 42a of the connector section 42. The fold along the fold line 126 is such that the uppermost section is folded back between adjacent sections (FIG. 8).

The folds formed in the lower portion 46 and upper portion 44 along the fold lines 114–120 and 126–132 (FIG. 7) extend through the folds formed in the outboard portion 48 and inboard portion 50 along the fold lines 96, 98, 100, 108 and 110 (FIG. 4). The fold lines 114–120 and 126–132 formed in the upper and lower portions 44 and 46 (FIG. 7) of the main section 40 of the air bag 20 extend perpendicular to the fold lines 96, 98, 100, 108 and 110 (FIG. 4) formed in the outboard portion 48 and inboard portion 50 of the main section of the air bag.

During the folding of the air bag 20, the lower portion 46 (FIG. 7) of the main section 40 of the air bag is folded in the zig-zag fashion indicated in dashed lines in FIG. 8 before the upper portion 44 of the main section 40 is folded. This results in the folded lower portion 46 forming a stack 138 (FIG. 9) while the upper portion 44 is still flat. It should be understood that the stack 138 is formed by material which has been subjected to two folding operations. The first folding operation, indicated in dashed lines in FIG. 5, resulted in the formation of the stacks 90 and 92 (FIG. 7). The second folding operation, indicated in dashed lines in FIG. 8, resulted in the formation of the stack 138.

Once the stack 138 has been formed, the stack is offset to the right (as viewed in FIGS. 8 and 9) to a location above a rigid metal connector ring 142 (FIG. 9) located in the lower end (as viewed in FIG. 9) of the connector section 42. The rigid metal connector ring 142 has a rectangular configuration corresponding to the rectangular configuration of the lower end of the connector section 42. The connector ring 142 has a pair of relatively long parallel main sections 141 and 143 (FIG. 9) which are interconnected by a pair of relatively short parallel end sections (not shown). The connector ring 142 defines a rectangular central opening 144 having a size and configuration which is approximately the size and configuration of the lower end (as viewed in FIGS. 6, 8 and 9) of the connector section 42.

Figure 9:
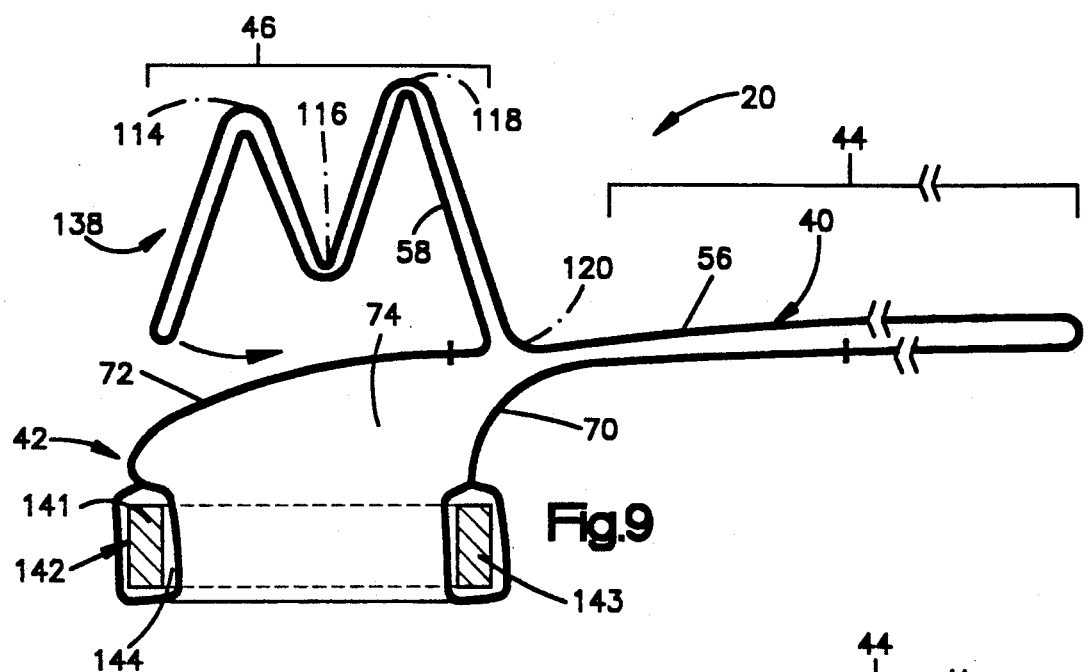
FIGS. 9-11 are schematic views illustrating the manner in which the air bag is folded.

When the stack 138 has been positioned over the connector ring 142, the panel 72 of the connector section 42 extends across the connector ring (FIG. 9). The panel 70 of the connector section 42 is offset to the right (as viewed in FIG. 9) of the connector ring 142. Although the various layers of the stack 138 have been illustrated in FIG. 9 as being spaced apart, it should be understood that the layers of the stack 138 are disposed in abutting engagement and are pressed firmly together.

Figure 10:
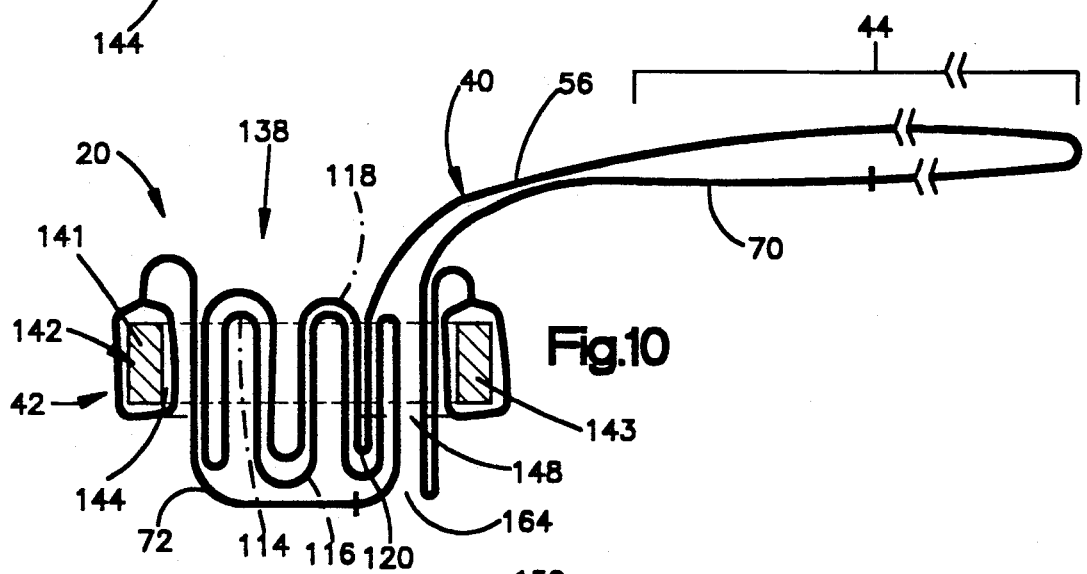

The stack 138 is moved, from the position shown in FIG. 9 to the position shown in FIG. 10, downwardly against the panel 72 of the connector section 42. As the stack 138 is moved downwardly, the material of the connector section panel 72 and the stack 138 move into the opening 144 formed by the connector ring 142 (FIG. 10). This results in the stack 138, formed by the material of the lower portion 40 of the air bag 20, being enclosed by the panel 72 of the connector section 42. Also, panel 70 is tucked into the ring 143 as shown in FIG. 10.

The panel 72 of the connector section 42 cooperates with the panel 70 and connector ring 142 to form a passage 148 (FIG. 10). The passage 148 extends from the lower side (as viewed in FIG. 10) of the stack 138 to the upper side of the stack. The connector section panel 72 extends completely around the vertical sides (as viewed in FIG. 10) of the stack 138.

Figure 11:
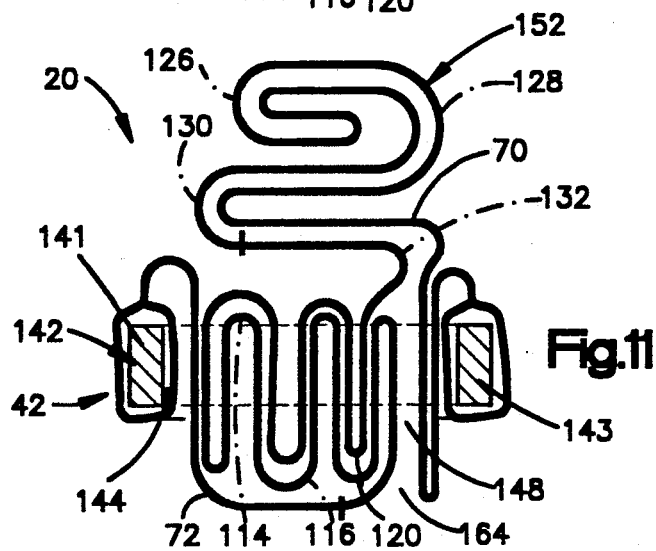

Once the rectangular stack 138 is disposed in the connector ring 142, the upper portion 44 of the main section 40 of the air bag 20 is folded in the manner indicated in dashed lines in FIG. 8 along the fold lines 126, 128, 130 and 132 to form a rectangular stack 152 (FIG. 11). The connector section panel 70 is disposed beneath a portion of the rear panel 56 of the air bag 20 prior to folding of the upper portion of the main section 40 to form the stack 152 (FIG. 10). Therefore, the connector section panel 70 is folded during folding of the main section 40 of the air bag 20 along the fold line 132.

The rectangular stack 152 is positioned in alignment with the stack 138 as shown in FIG. 11. The rectangular stack 152 has a size, as viewed in a horizontal plane (i.e., a plane perpendicular to the plane of FIG. 11), which is approximately the same size as the opening 144 formed by the connector ring 142. Although the various layers of the stacks 138 and 152 have been shown as being loosely positioned relative to each other in FIG. 11 for purposes of clarity of illustration, it should be understood that the various layers of the two stacks 138 and 152 are positioned in tight abutting engagement with each other to minimize the combined extent of the two stacks 138 and 152.

The passage 148 extends past the stack 138 to the lower end (as viewed in FIG. 11) of the stack 152. The upper panel 70 of the connector section 42 forms a portion of the lowermost layer of the stack 152.

When the air bag 20 has been tightly folded for storage and positioned relative to the connector ring 142, approximately one-third of the height of the folded air bag 20 projects upward (as viewed in FIG. 11) from a horizontal (as viewed in FIG. 11) plane extending through the center of the connector ring 142. Approximately two-thirds of the height of the tightly folded air bag 20 projects downward (as viewed in FIG. 11) from the horizontal plane through the center of the connector ring 142. When the entire air bag 20 has been tightly folded and placed within the connector ring 142, the air bag 20 and connector ring 142 are preferably covered with a shrink wrap plastic film to hold the air bag 20 in a compact package for mounting in the dashboard 22 of a vehicle.

When the air bag 20 is to be mounted in the dashboard 22 of a vehicle, the air bag 20 is oriented as shown in FIG. 12. The connector ring 142 is fixed to a housing (not shown) mounted in the vehicle dashboard 22. The passenger compartment is toward the right (as viewed in FIG. 12) and the front of the vehicle is toward the left (as viewed in FIG. 12). A cylindrical inflator assembly 158 is mounted forward of the air bag 20 in a suitable housing. Upon sudden vehicle deceleration, the inflator assembly 158 is activated to provide fluid (e.g., nitrogen gas) under pressure to inflate the air bag 20. Although the inflator assembly 158 could have many different constructions, it is preferred to construct the inflator assembly in the manner disclosed in U.S. Pat. No. 4,817,828.

Upon activation of the inflator assembly 158, there is sufficient heat to destroy the plastic shrink wrap cover around the air bag 20. The high pressure nitrogen gas applies force against the leftward (as viewed in FIG. 12) side of the folded air bag 20. This pushes the two stacks 138 and 152 of material outwardly toward the passenger 36, that is, in the direction of the arrow 160 in FIG. 12.

As the fluid pressure acts against the connector section panel 72, the material of the air bag 20 moves rightwardly (as viewed in FIG. 12). Simultaneously, the fluid flows into an entrance 164 of the passage 148 (FIG. 11). The connector section panel 72 blocks the initial gas flow from entering between the folds of the stack 138. The passage 148 conducts the high pressure fluid into the upper portion 44 of the air bag 20 forming the stack 152 (FIG. 11). Thus, the connector section panels 70 and 72 cooperate to block fluid flow between the layers of the stack 138 and to direct fluid flow into the upper portion 44 of the air bag forming the stack 152. Therefore, the initial fluid flow moves past the stack 138 and begins inflating the stack 152 before inflating the stack 138 even though the stack 138 is closer to the inflator assembly 158 than the stack 152.

The fluid pressure in the stack 152 moves the upper portion 44 of the air bag 20 straight outward, in the direction of the arrow 160, toward the torso 34 of the passenger 36 (FIG. 2). As this is occurring, the material forming the stack 138 is pulled out of the connector ring 142. As the upper portion 44 of the air bag 20 is moved adjacent to the torso 34 of the passenger 36, the lower portion 46 of the air bag is deployed downward toward the lower portion of the torso 34 and lap 32 of the passenger 36.

Continued inflation of the air bag 20 results in the upper portion 44 of the air bag moving upward between the head 45 of the passenger 36 and the windshield 28. At the same time, the lower portion 46 of the air bag reaches a fully inflated condition adjacent the lap 32 and lower portion of the torso 34 of the passenger 36.

It should be understood that the foregoing sequence of steps in the inflation of the air bag 20 occur very rapidly. The air bag 20 reaches the partially inflated condition shown in FIG. 2 in approximately 30 milliseconds after inflation begins. After 40 milliseconds have passed from the beginning of inflation, the air bag 20 will be almost completely inflated. At this time, the upper portion 44 of the air bag 20 will be between the head 45 of the passenger 36 and the windshield 28. The lower portion 46 of the air bag 20 will be adjacent the lap 32 and lower portion of the torso 34 of the passenger 36.

The construction of the connector section 42 and the manner in which it is connected with the main section 40 of the air bag 20 is illustrated in FIG. 13. The connector section 42 is made of double layers of material. Accordingly, as shown in FIG. 13, the upper connector panel 70 and lower connector panel 72 of the connector section 42 are formed of double layers of material. The double layers of material extend around the rectangular connector ring 142. The double layers of material of the upper and lower panels 70 and 72 of the connector section 42 are connected with double layers of material which form a part of the front panel 58 of the main section 40. The double layered material in the front panel 58 of the main section 40 extends upwardly and downwardly from the connector section 42 and outwardly to the seams 84 and 86 at the inboard and outboard end panels 64 and 66 of the main section 40 of the air bag 20 (FIG. 3). The connector section 42 could be connected with the main section 40 of the air bag 20 in a different manner if desired.

From the above description of the invention, those skilled in the art will perceive improvements, changes and modifications. Such improvements, changes and modifications within the skill of the art are intended to be covered by the appended claims.

Having described the invention, the following is claimed:

1. An inflatable air bag for restraining a vehicle occupant when inflated, said air bag being made of a material comprising:
   a first portion having a first plurality of folds disposed in a stacked relationship, said first portion of said air bag including surface means for extending adjacent the torso of the occupant when said air bag is inflated,
   a second portion having a second plurality of folds disposed in a stacked relationship, said second portion of said air bag including surface means for extending adjacent the vehicle windshield when said air bag is inflated; and
   said material forming means extending along the first plurality of folds for retarding an initial flow of inflating fluid into the first portion of said air bag and for directing said initial flow of inflating fluid into the second portion of said air bag.

2. An inflatable air bag as set forth in claim 1 wherein said first and second portions of said air bag form a main section of said air bag which is located between the occupant of the vehicle and a dashboard of the vehicle when said air bag is inflated, said air bag further comprising a connector section which extends between said main section of said air bag and the dashboard of the vehicle when said air bag is inflated, said means extending along the first plurality of folds being a part of said connector section of said air bag.

3. An inflatable air bag as set forth in claim 1 wherein said first portion of said air bag is folded in a zig-zag fashion and is disposed in a stack with a first series of bends on a first side of the stack and a second series of bends on a second side of the stack opposite from the first side, said second portion of said air bag is folded in a zig-zag fashion, and said means extending along the first plurality of folds extends along the first series of bends to retard a flow of fluid into folds in the first portion of said air bag.

4. An inflatable air bag as set forth in claim 1 wherein said first and second portions of said air bag form a main section of said air bag which is located between the occupant of the vehicle and a dashboard of the vehicle when said air bag is inflated, said air bag having a connector section which interconnects said main section of said air bag and the dashboard of the vehicle when said air bag is inflated, said connector section of said air bag including a frame which extends around at least some of the folds of the first plurality of folds when the first plurality of folds is in the stacked relationship prior to inflation o said air bag, at least some of the folds of said second plurality of folds being offset from said frame toward the occupant of the vehicle when said second plurality of folds is in the stacked relationship prior to inflation of said air bag.

5. An inflatable air bag as set forth in claim 1 wherein said first and second portions of said air bag form a main section of said air bag which is located between an occupant of the vehicle and a dashboard of the vehicle when said air bag is inflated, said air bag having a connector section interconnecting said main section of said air bag and the dashboard of the vehicle when said air bag is inflated, said main section of said air bag extending upward and downward from said connector section and extending sideward in opposite directions from said connector section of said air bag when said air bag is inflated, said connector section of said air bag including a rectangular frame having upper and lower sections interconnected by end sections which are shorter than said upper and lower sections, said upper and lower sections and said end sections of said frame cooperating to at least partially define a rectangular opening, said main section of said air bag being folded to fit into the rectangular opening formed by said frame prior to inflation of said air bag.

6. An inflatable air bag as set forth in claim 5 further including a third plurality of folds, each fold of said third plurality of folds being formed in said first and second portions of said air bag and having a longitudinal central axis which extends perpendicular to a longitudinal central axis of each of the folds in said first and second pluralities of folds and to longitudinal central axes of said upper and lower sections of said frame, and a fourth plurality of folds, each fold of said fourth plurality of folds being formed in said first and second portions of said air bag and having a longitudinal central axis which extends perpendicular to said longitudinal central axis of each of the folds of said first and second pluralities of folds and to said longitudinal central axes of said upper and lower sections of said frame.

7. An inflatable air bag as set forth in claim 6 wherein said first and second pluralities of folds are formed after said third and fourth pluralities of folds and extend through said third and fourth pluralities of folds.

8. An inflatable air bag for restraining a vehicle occupant when inflated, said air bag comprising:

a first portion having a first plurality of folds disposed in a stacked relationship, said first portion of said air bag including a surface area which is to be adjacent the torso of the occupant when said air bag is inflated, a second portion having a second plurality of folds disposed in a stacked relationship, said second portion of said air bag including a surface area which is to be adjacent the vehicle windshield when said air bag is inflated, said first and second portions of said air bag form a main section of said air bag which is located between the occupant of the vehicle and a dashboard of the vehicle when said air bag is inflated, said main section of said air bag including a front panel which is disposed in a plane adjacent to the dashboard of the vehicle when said air bag is inflated; and a connector section which extends between said main section of said air bag and the dashboard of the vehicle when said air bag is inflated, said connector section extending transversely to said plane of said front panel when said air bag is inflated, said connector section including means extending along the first plurality of folds for retarding an initial flow of the inflating fluid into the first portion of said air bag and for directing said initial flow of inflating fluid into the second portion of said air bag.

9. An inflatable air bag for restraining a vehicle occupant when inflated, said air bag comprising:

a first portion having a first plurality of folds disposed in a stacked relationship, said first portion of said air bag including a surface area which is to be adjacent the torso of the occupant when said air bag is inflated, a second portion having a second plurality of folds disposed in a stacked relationship, said second portion of said air bag including a surface area which is to be adjacent the vehicle windshield when said air bag is inflated, said first and second portions of said air bag form a main section of said air bag which is located between the occupant of the vehicle and a dashboard of the vehicle when said air bag is inflated;

means extending along the first plurality of folds for retarding an initial flow of inflating fluid into the first portion of said air bag and for directing said initial flow of inflating fluid into the second portion of said air bag; and a connector section interconnecting said main section of said air bag and the dashboard of the vehicle when said air bag is inflated, said connector section of said air bag including a frame which extends around some of the folds of the first plurality of folds when the first plurality of folds is in the stacked relationship prior to inflation of said air bag, some of the folds of said first plurality of folds being offset from said frame in a direction away from the occupant of the vehicle when said plurality of folds is in the stacked relationship prior to inflation of said air bag.

10. An inflatable air bag for restraining a vehicle occupant when inflated, said air bag comprising:

a first portion having a first plurality of folds disposed in a stacked relationship, said first portion of said air bag including a surface area which is to be adjacent the torso of the occupant when said air bag is inflated, a second portion having a second plurality of folds disposed in a stacked relationship, said second portion of said air bag including a surface area which is to be adjacent the vehicle windshield when said air bag is inflated;

a third plurality of folds, each fold of said third plurality of folds being formed in said first and second portions of said air bag and having a longitudinal central axis which extends perpendicular to a longitudinal central axis of each of the folds of said first plurality of folds and to a longitudinal central axis of each of the folds of said second plurality of folds, said first and second pluralities of folds being formed after said third plurality of folds and extending through said plurality of folds; and means extending along the first plurality of folds for retarding an initial flow of inflating fluid into the first portion of said air bag and for directing said initial flow of inflating fluid into the second portion of said air bag.

11. An inflatable air bag as set forth in claim 10 further including a fourth plurality of folds, each fold of said fourth plurality of folds being formed in said first and second portions of said air bag and having a longitudinal central axis which extends perpendicular to said longitudinal central axis of each of the folds of said first plurality of folds and to said longitudinal central axis of each of the folds of said second plurality of folds, said first and second pluralities of folds being formed after said fourth plurality of folds and extending through said fourth plurality of folds.

12. An inflatable air bag for restraining a vehicle occupant when inflated, said air bag comprising:

a first portion for extending adjacent the torso of the occupant when said air bag is inflated, said first portion having a plurality of folds disposed in a stacked relationship;

a second portion for extending adjacent the vehicle windshield when said air bag is inflated, said second portion having a second plurality of folds disposed in a stacked relationship; and a connector portion extending between a dashboard of the vehicle and the first and second portion when said air bag is inflated, said connector portion encircling the first plurality of folds and retarding an initial flow of inflating fluid into the first portion and directing the initial flow of inflating fluid into the second portion.

* * * * *

UNITED STATES PATENT AND TRADEMARK OFFICE
CERTIFICATE OF CORRECTION

PATENT NO. : 5,178,407

DATED : January 12, 1993

INVENTOR(S) : Scott A. Kelley

It is certified that error appears in the above-identified patent and that said Letters Patent is hereby corrected as shown below:

Column 8, Line 22, Claim 4, Change "o" to --of--.

Column 9, Line 58, Claim 9, After "said" insert --first--.

Signed and Sealed this

Twenty-sixth Day of October, 1993

Attest:

BRUCE LEHMAN

Attesting Officer

Commissioner of Patents and Trademarks